May 23, 1950 — O. S. GROPPER — 2,508,671
LICENSE PLATE APPARATUS
Filed Feb. 19, 1947
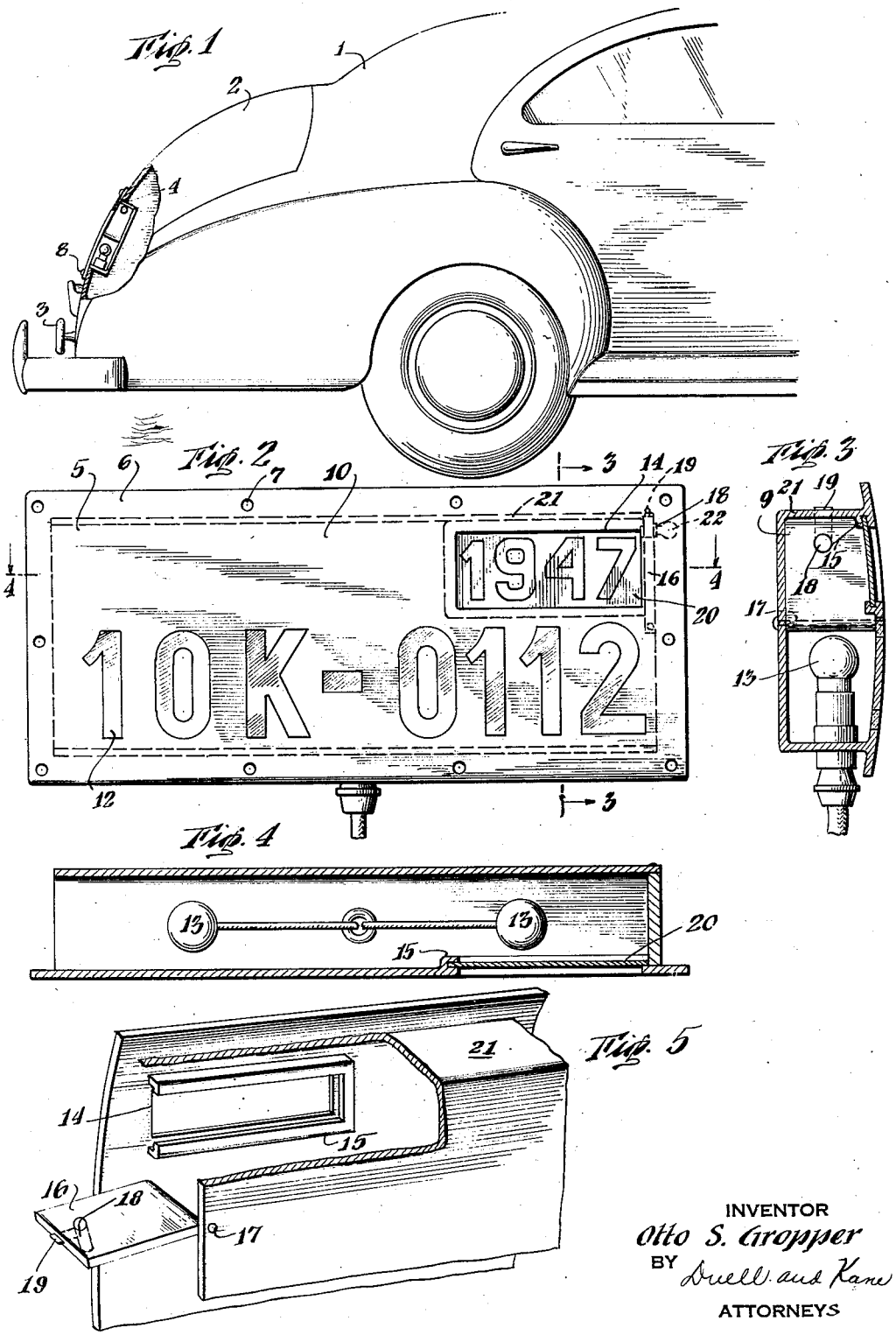
INVENTOR
Otto S. Gropper
BY Duell and Kane
ATTORNEYS Patented May 23, 1950

2,508,671

UNITED STATES PATENT OFFICE 2,508,671

LICENSE PLATE APPARATUS

Otto S. Gropper, Woodside, N. Y.

Application February 19, 1947, Serial No. 729,448

3 Claims. (Cl. 40—125)

This invention relates to a license plate apparatus for vehicles and in particular motor cars. Its object is to provide a license plate permanently affixed to the body of the vehicle but provided with a small inset tag which can be changed easily from year to year or whenever occasion arises. A further object is to provide a license plate with a detachable auxiliary plate wherein both the main plate and the auxiliary plate are secured against an unauthorized withdrawal and wherein the securing means of the auxiliary plate are easily accessible and convenient to manipulate. A still further object is a license plate apparatus embodying the aforementioned features of a main plate and a detachable auxiliary plate wherein the apparatus forms a composite unit which is quickly assembled with the body of the vehicle.

Further objects will appear from the following description of the invention when read in the light of accompanying drawings, of which:

Fig. 1 shows a side view of the license plate apparatus after attachment to the body of an automobile, the body being partly broken away for purposes of illustration;

Fig. 2 is a front illustration of the apparatus showing the auxiliary plate moved into position;

Fig. 3 is a vertical section through the apparatus on lines 3—3 of Fig. 2;

Fig. 4 is a horizontal section along lines 4—4 of Fig. 2;

Fig. 5 is a rear view of the apparatus in perspective and partly broken away.

Referring to the drawings, it will be seen that the reference character 1 indicates the body of a car which is provided with the usual trunk compartment 2. A handle 3 serves to open the compartment and also contains a lock mechanism of the conventional type. The trunk compartment is formed with an aperture 4 at the face that constitutes the rear of the vehicle. The main body or permanent part of the license plate consists of a flat member which circumferentially has a size somewhat larger than the opening 4 whereby a peripheral seating portion 6 is formed. The portion 6 may be apertured, as indicated at 7, for the reception of locking means like rivets or screws 8. As appears from the drawings, the shape of the plate is curved so as to conform to the outlines of the vehicle body. A box-like structure 9 is provided at the rear of the plate which, as shown in Fig. 3, may be formed in one piece with the plate.

In order to make the license number or other indicia visible, the plate 5 comprises an opaque portion 10 and cut out portions 11 which latter portions are formed from translucent material. Suitably, the entire plate is made of a plastic material and, if required, a colored backing plate (not shown) may be employed at its rear face. The previously referred to box 9 constitutes the supporting member for a source of light, shown as an electric bulb 13 in the drawings. It will be understood that the visibility of the indicia may be obtained also in other ways as, for instance, by reversing the contrast effect and making the main portion of the plate translucent and the indicia-carrying areas opaque.

The main plate 5 also has an aperture 14 of preferably rectangular shape. Encircling this aperture at the rear face of the plate is an angular retaining flange 15 which, in the embodiment shown, is formed integrally with the main plate and the box-like structure. The retaining flange surrounds the aperture 14 at three sides and thus acts as a slotted member open at one of its vertical sides.

The lateral wall of the box structure which is adjacent the said open portion of the retaining frame carries a door or other closure member 16 which is secured by a hinge 17 to the box and face plate. The door is provided with a lock mechanism 18 and, by means of the tongue 19, can be locked in closing position. As seen in dotted lines in Figs. 2 and 5, the lock mechanism can be a conventional cylinder lock inserted through the door 16. Also, as seen in Figs. 2, 3 and 5, the tongue 19 protrudes upward and outward from the cylinder lock 18 to pass through and engages the top wall 21 of the box 9. The tongue 19 is locked by turning a key 22, shown in Fig. 2, in the cylinder lock 18.

From the description so far given, it will be apparent that an auxiliary plate 20 can be introduced after opening of the door 16 into the slot frame so as to cover the aperture 14 of the main plate from the rear. In this manner additional indicia like, for instance, the year for which the license tax has been paid and, if desired, a specific State can detachably be incorporated in the license plate. Illumination for visibility of the indicia appearing on the auxiliary plate can be obtained in the same way as in case of the main plate. It will also be apparent that after locking of the door 16, the auxiliary plate is secured against removing. As shown in Fig. 2, the door 16 when closed, abuts the ends of the flange 15 to thereby prevent any displacement of the auxiliary plate 20 during operation of the vehicle. The composite body of the main and auxiliary plate and illuminating device can thus easily be assembled and attached to or removed from the body of the vehicle.

Suitably, the attachment means provided by the apertures 7 and rivets or screws 8 will be arranged in a manner that they cannot be tampered with from the outside. Furthermore, because of the securement of the entire license plate apparatus within the confines of the trunk compartment, the locking of said compartment provides another effective protection against interference with the device. The auxiliary license plate, therefore, is protected against withdrawal by the lock mechanism 18, 19 and the entire apparatus, including the auxiliary plate, is additionally secured by the trunk compartment lock 3 and the non-detachable securement of the main plate to the vehicle.

Obviously, modifications of the apparatus are possible without departing from the essential spirit of the invention. Therefore, I do not wish to be limited otherwise than by the appended claims.

What I claim is:

1. A vehicle comprising a compartment disposed at its rear, lock means for the said compartment, an opening in the rear face of said compartment, a license plate adapted outwardly to cover said opening, means to secure said plate exteriorly to the portions of said compartment adjacent said opening, a box-like structure supported rearwardly by said license plate and adapted for introduction into said opening, a light source disposed in said box-like structure, an aperture in said license plate, slot-forming means surrounding said aperture at the inside of said license plate but for an intermediate gap, an opening in said box-like structure for access to said slot-forming means, a closure member hinged to the said box-like structure for optionally closing the latter opening said closure member, when in closed position, extending across said intermediate gap to close the same, locking means for said closure member, and a selectively translucent auxiliary plate adapted to be introduced into said slot-forming means through said gap after opening of said closure member.

2. A license plate apparatus comprising a box-like structure adapted to be introduced into an opening of the vehicle body, the said box-like structure having a major wall including selectively translucent portions to display license plate indicia, the outer surface of said major wall being in excess of that of said opening in said vehicle body, a source of illumination disposed in said box-like structure and to the rear of said major wall, means to secure said major wall exteriorly to said vehicle body with the said box-like structure introduced through said opening, an aperture in said major wall, slot forming means encircling the latter aperture interiorly of said wall, said slot-forming means being interrupted to provide an entrance opening, said box-like structure having an opening in registry with said entrance opening, an auxiliary plate adapted to be slid through the entrance opening into said slot-forming means so as to cover the aperture in said major wall, and a closure member hinged to said box-like structure for closing the opening therein, said closure member extending across the said entrance opening to complete the enclosure of said auxiliary plate.

3. A vehicular license plate, comprising an open-ended channel-like frame for introduction into an opening in the wall of a vehicle body, said frame having a cover plate overlapping the edge of said wall opening, said plate having light-permeable portions displaying license plate indicia; a groove-providing flange disposed on the inner face of said plate and defining three sides of an opening formed in said plate, the fourth side facing an open end of said channel frame; an auxiliary license plate slidable into said flange structure from the open end thereof to provide a closure for said plate opening; a wall member hingedly mounted within said frame relative to the open end of said flange structure to provide a closure for the open end thereof; means for securing said member in closed position; and means for illuminating the interior of said frame.

OTTO S. GROPPER.

REFERENCES CITED

The following references are of record in the file of this patent:

UNITED STATES PATENTS

| Number | Name | Date |
|---|---|---|
| 1,977,261 | Brown | Oct. 16, 1934 |
| 2,025,952 | Levet | Dec. 31, 1935 |
| 2,104,539 | Hacker | Jan. 4, 1938 |
| 2,156,806 | Ducey | May 2, 1939 |